(12) United States Patent
McKenney et al.

(10) Patent No.: US 9,824,039 B2
(45) Date of Patent: **\*Nov. 21, 2017**

(54) SIGNAL INTERRUPTS IN A TRANSACTIONAL MEMORY SYSTEM

(71) Applicant: International Business Machines Corporation, Armonk, NY (US)

(72) Inventors: Paul E. McKenney, Beaverton, OR (US); Maged M. Michael, Danbury, CT (US); Michael Wong, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 463 days.

This patent is subject to a terminal disclaimer.

(21) Appl. No.: 14/021,090

(22) Filed: Sep. 9, 2013

(65) Prior Publication Data
US 2015/0074309 A1  Mar. 12, 2015

(51) Int. Cl.
G06F 9/48 (2006.01)
G06F 13/24 (2006.01)
G06F 9/46 (2006.01)

(52) U.S. Cl.
CPC .............. *G06F 13/24* (2013.01); *G06F 9/466* (2013.01); *G06F 9/4812* (2013.01)

(58) Field of Classification Search
CPC .......... G06F 9/466; G06F 9/467; G06F 9/468; G06F 9/4812; G06F 13/24
USPC ......... 710/260, 262, 266, 269; 712/216, 244
See application file for complete search history.

(56) References Cited

U.S. PATENT DOCUMENTS

| | | | | |
|---|---|---|---|---|
| 5,636,366 A | * | 6/1997 | Robinson et al. | 711/163 |
| 5,701,501 A | * | 12/1997 | Gandhi | 712/203 |
| 5,778,220 A | * | 7/1998 | Abramson et al. | 712/244 |
| 5,937,199 A | * | 8/1999 | Temple | 710/262 |
| 6,857,036 B2 | * | 2/2005 | Lesartre | 710/200 |
| 7,546,446 B2 | * | 6/2009 | Henry et al. | 712/244 |
| 8,668,661 B2 | * | 3/2014 | Mueller et al. | 602/26 |

(Continued)

OTHER PUBLICATIONS

Definition of "Transactional Memory" from Wikipedia, <https://en.wikipedia.org/wiki/Transactional_memory>, accessed on Sep. 25, 2015.*

(Continued)

*Primary Examiner* — Glenn A Auve
(74) *Attorney, Agent, or Firm* — DeLizio Law, PLLC

(57) ABSTRACT

In some embodiments, an apparatus includes a processor that is configured to execute computer usable program code to perform operations. The operations include executing an atomic transaction in a system having a transactional memory. The operations include receiving a signal interrupt during executing of the atomic transaction. The operations include storing a state of the signal interrupt to enable subsequent execution of the signal interrupt. The operations include returning to executing the atomic transaction until the atomic transaction is at least one of completed and aborted. The operations include after executing the atomic transaction is at least one of completed and aborted, determining whether the signal interrupt is received during executing of the atomic transaction. The operations include after determining that the signal interrupt is received during executing of the atomic transaction, retrieving the state of the signal interrupt.

13 Claims, 7 Drawing Sheets

(56) References Cited

U.S. PATENT DOCUMENTS

| | | | |
|---|---|---|---|
| 8,788,794 B2* | 7/2014 | Serebrin et al. | 712/216 |
| 9,361,114 B1* | 6/2016 | Tene | G06F 9/3861 |
| 2008/0040524 A1* | 2/2008 | Zimmer et al. | 710/267 |
| 2009/0172675 A1* | 7/2009 | Grossman et al. | 718/101 |
| 2011/0209151 A1* | 8/2011 | Chung et al. | 718/101 |
| 2011/0296148 A1* | 12/2011 | Cain et al. | 712/228 |
| 2011/0314230 A1 | 12/2011 | Zhang et al. | |
| 2011/0314244 A1 | 12/2011 | Sodhi et al. | |
| 2012/0084477 A1* | 4/2012 | Arndt et al. | 710/266 |

OTHER PUBLICATIONS

"U.S. Appl. No. 14/068,214 Office Action", dated Nov. 20, 2015, 13 pages.

"U.S. Appl. No. 14/068,214 Final Office Action", dated Apr. 14, 2016, 18 pages.

"U.S. Appl. No. 14/068,214 Office Action", dated Dec. 13, 2016, 16 pages.

\* cited by examiner

SIGNAL INTERRUPTS IN A TRANSACTIONAL MEMORY SYSTEM

BACKGROUND

Embodiments of the inventive subject matter generally relate to the field of computers, and, more particularly, to handling of signal interrupts in a transactional memory system.

Systems with transactional memory include atomic transactions to allow for concurrent execution of multiple threads of a program or programs. An atomic transaction can be defined as a transaction that is precluded from containing operations that can be detected external to the transaction. Problems can arise when handling signal interrupts during execution of an atomic operation. For example, an interrupt handler for a signal interrupt can contain operations that can be detected external to the current atomic transaction being processed at the point when the signal interrupt is received. Examples of operations detectable external to an atomic transaction can include accesses to atomic objects, memory lock acquisitions and releases, etc. Such operations by the handler would be in violation of the definition of an atomic transaction.

There are a number of insufficient approaches to processing a signal interrupt that is received during an atomic transaction. For a first conventional approach, the signal interrupt causes the atomic transaction to abort. The interrupt handler is processed and then the atomic transaction is retried. This first conventional approach is viable for systems that permit atomic transactions to be aborted and retried. However, such approach can starve atomic transactions from completion for a system have frequent signal interrupts.

For a second conventional approach, the signal is allowed to interrupt the atomic transaction. This approach can delay the atomic transaction, thereby making the atomic transaction more prone to conflicts and resulting in aborts, rollbacks, and retries. Also (as described above), some interrupt handlers might contain operation that are illegal within atomic transactions.

For a third conventional approach, signals are blocked across all atomic transactions. Such approach can be problematic because of the system calls needed to block signals can be the computational expensive on some platforms. Also, an atomic transaction containing an infinite loop can block signal interrupts indefinitely. Such situation may cause great frustration for users attempting to send a signal interrupt to regain control of a program (e.g., control-C, control-Z, etc.).

SUMMARY

Some embodiments include a computer program product for processing a signal interrupt. The computer program product includes a computer readable storage medium having computer usable program code embodied therewith. The computer usable program code includes a computer usable program code. The computer usable program code is configured to execute an atomic transaction in a system having a transactional memory. The computer usable program code is configured to receive the signal interrupt during execution of the atomic transaction. The computer usable program code is configured to initiate execution of a plurality of instructions of an interrupt handler for processing the signal interrupt until execution of an instruction of the plurality of instructions would be detectable external to the atomic transaction. Prior to execution of the of the instruction of the plurality of instructions would be detectable external to the atomic transaction, the computer usable program code is configured to cease execution of the interrupt handler and store a state of the signal interrupt to enable resumption of execution of the signal interrupt. Also prior to execution of the of the instruction of the plurality of instructions would be detectable external to the atomic transaction, the computer usable program code is configured to return to execution of the atomic transaction until the atomic transaction is at least one of completed and aborted. The computer usable program code is configured to resume execution of the interrupt handler of the signal interrupt at a point in the interrupt handler where the instruction is to be executed. And, the computer usable program code is configured to return from executing of the atomic transaction.

In some embodiments, an apparatus includes a processor. The apparatus includes a computer readable storage medium configured to store computer usable program code, wherein the computer usable program code is executable on the processor in a transaction memory configuration. The computer usable program code is configured to execute an atomic transaction. The computer usable program code is configured to receive a signal interrupt during executing of the atomic transaction. The computer usable program code is configured to store a state of the signal interrupt to enable subsequent execution of the signal interrupt. The computer usable program code is configured to return to executing the atomic transaction until the atomic transaction is at least one of completed and aborted. After execution of the atomic transaction is at least one of completed and aborted, the computer usable program code is configured to determine whether the signal interrupt is received during executing of the atomic transaction. After determination that the signal interrupt is received during execution of the atomic transaction, the computer usable program code is configured to retrieve the state of the signal interrupt and execute an interrupt handler for processing the signal interrupt. The computer usable program code is also configured to return from execution of the atomic transaction.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences and computer program products that embody techniques of the present inventive subject matter. However, it is understood that the described embodiments may be practiced without these specific details. For instance, although examples refer to Portable Operating System Interface (POSIX) signals, any type of signals can be processed during execution of an atomic transaction in a transactional memory system. In other instances, well-known instruction instances, protocols, structures and techniques have not been shown in detail in order not to obfuscate the description.

Some embodiments enable processing of signal interrupts while an atomic transaction is being executed in a transactional memory system. Example embodiments overcome the shortcomings of the conventional approaches described above. For example, various embodiments can permit lock-based implementations of transactional memory, while avoiding starvation of processing of atomic transactions that can occur due to repeated aborts from a stream of signal interrupts. In addition, various embodiments can avoid increasing the probability of a conflict of the atomic transaction with other transactions. Various embodiments can also allow interrupt handlers to contain operations that are prohibited within atomic transactions and can prevent atomic transactions having infinite loops from indefinitely delaying processing of signals.

Figure 1:
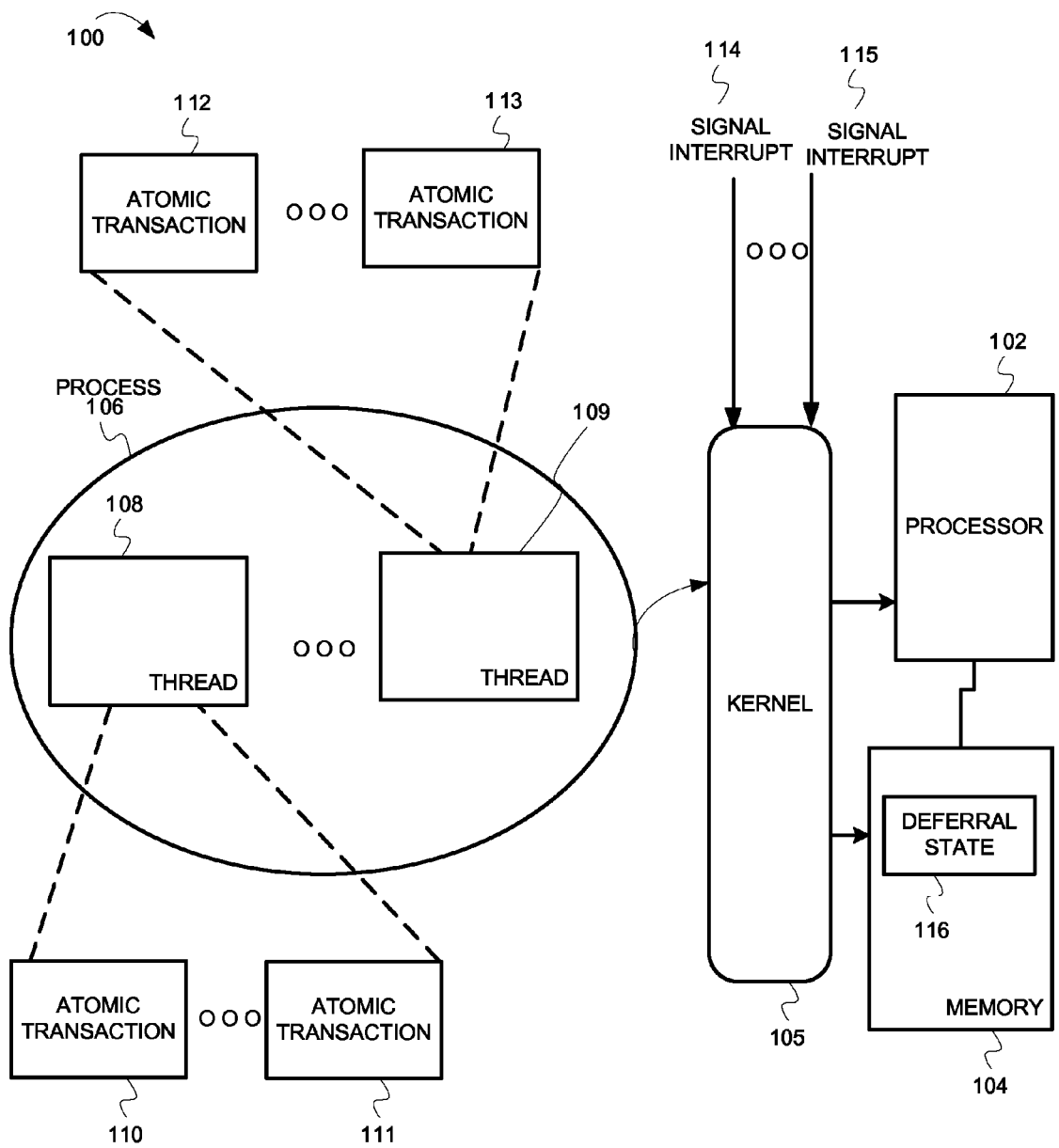
FIG. 1 depicts a transactional memory system for handling signal interrupts while an atomic operation is being executed, according to some embodiments.

FIG. 1 depicts a transactional memory system for handling signal interrupts while an atomic operation is being executed, according to some embodiments. FIG. 1 depicts a system 100 that includes a processor 102, a memory 104, a kernel 105, and a process 106. The processor 102 and the memory 104 are communicatively coupled together. The kernel 105 can be part of the operating system of the system 100. The kernel 105 can be configured to manage input/output (I/O) requests from software, processes, threads, etc. and translates the I/O requests into instructions for the processor 102, the memory 104, and other components in the system 100 (e.g., hard disk drive).

A process 106 is configured to execute on the system 100. In this example, the process 106 includes a number of threads (shown as threads 108-109.). Also in this example, the thread 108 includes a number of atomic transactions (shown as atomic transactions 110-111), and the thread 109 includes a number of atomic transactions (shown as atomic transactions 112-113). The process 106 is communicatively coupled to the kernel 105. The kernel 105 can receive the requests from the threads 108-109 and translate the requests to instructions to be executed by processor 102. In this example, the kernel 105 can also respond to requests from the atomic transactions 110-111 and the atomic transactions 112-113. Each of the atomic transactions 110-111 and 112-113 is a transaction that can include a number of operations that are precluded from being detected external to the atomic transaction.

During execution of at least one of the atomic transactions 110-111 and 112-113, a number of signal interrupts 114-115 can be received by the kernel 105. The signal interrupts 114-115 includes signals that indicate an event needs immediate attention. The signal interrupts 114-115 provide notification of a condition that can require interruption of the current instructions being executed by the processor 102. Typically in response to the signal interrupts 114-115, the processor 102 can cease execution of its current instructions and save its state. The processor 102 can then execute an interrupt handler associated with the particular signal interrupt to respond to the event. The system 100 also includes a deferral state 116 that can be stored in the memory 104. The deferral state 116 can be a data structure (e.g., an array) that stores states of those signal interrupts 114-115 that are deferred while at least one of the atomic transactions 110-111 and 112-113 is being executed.

Assume that during operation of the system 100 the processor 102 is executing the atomic transaction 110 when the signal interrupt 114 is received by the kernel 105. In some embodiments, in response to the signal interrupt 114, the interrupt handler associated with the signal interrupt 114 can be deferred until the atomic transaction 110 either commits or aborts. Prior to returning from execution of the atomic transaction 110, the processor 102 can first execute interrupt handlers for any deferred signal interrupts that occurred during execution of the atomic transaction 110. For example, within the signal invocation path for the signal interrupt 114, a transactional hook can be positioned. When the signal interrupt 114 is received and the transactional hook is reached, the state of the signal interrupt 114 can be saved. For example, the state can include an identification of the signal interrupt 114, an identification of the interrupt handler to invoke, any parameters provided as part of execution of the interrupt handler, etc. The state can be stored in the deferred state 116. For example, the deferred state 116 can be an array, wherein an element in the array corresponds to a signal. The elements of the array can store the state of the associated signal interrupt. For example, on POSIX systems, the deferred state 116 can be an array of siginfo_t structures. Therefore, the deferred state 116 can maintain a state of any number of signal interrupts that are received during execution of the atomic transaction 110. After saving the state of the signal interrupt 114, the processor 102 resumes execution of the atomic transaction 110 to commit or abort. Therefore, the processor 102 can resume execution of the atomic transaction 110 without invoking the interrupt handler for the signal interrupt 114. Also, as part of execution of the atomic transaction 110 after the atomic transaction 110 has committed or aborted, the processor 102 executes an instruction to perform a check regarding deferred handling of any signal interrupts. As part of this check, the processor 102 accesses the deferred state 116 to determine if there are any states of signal interrupts deferred therein. The processor 102 can invoke the associated interrupt handlers for signal interrupts whose states are stored in the deferred state 116. After any associated interrupt handlers are executed, the processor 102 can then consider execution of the atomic transaction 110 complete.

An infinite loop inside an atomic transaction that does not conflict with any other atomic transaction can cause the handling of signals to be deferred indefinitely. This situation can be problematic for users that want to abort execution of a process. For example, a user can abort execution of a process in a UNIX-based system by inputting a control-C or a control-Z. In response, a signal interrupt is generated, which is to result in the process being aborted.

Therefore in some embodiments, after the signal interrupt 114 is received, the atomic transaction 110 can check the type for the signal interrupt 114, prior to deferring the processing of the interrupt handler for the signal interrupt 114. If the signal interrupt 114 is a fatal signal which would result in the aborting of the process 106 that includes the atomic transaction 110, the interrupt handler for the signal interrupt 114 is not deferred. Rather, this fatal signal is processed prior to completion of the atomic transaction 110. Accordingly, after a signal interrupt is received, a check is made of whether the signal interrupt is a fatal signal. If the signal interrupt is a fatal signal, the interrupt handler for the signal interrupt 114 can be executed and not deferred until the atomic transaction 110 is committed or aborted. If the signal interrupt 114 is not a fatal signal, execution of the interrupt handler for the signal interrupt 114 can be deferred until the atomic transaction 110 is committed or aborted (as described above).

In some embodiments, if the signal interrupt 114 is a fatal signal, a flag can be set that precludes return to the atomic transaction 110 after the interrupt handler for the signal interrupt 114 is complete. Therefore, the processor 102 can be configured to check this flag after execution of an interrupt handler. If this flag is set, the processor 102 can abort the process 106 (including all threads) after the interrupt handler is executed.

In some embodiments, an atomic transaction can be rolled backed and subsequently re-executed. Specifically, systems having an atomic transaction that can be rolled backed are configured such that during execution of the atomic transaction the state of the system can be returned what it was prior to beginning its execution. For example, any changes to data caused by the atomic transaction can be backed out such that the value of the data is reset to its original value prior to the beginning of execution of the atomic transaction. Assuming that atomic transactions can be rolled back in the system 100, a timeout can be defined. If an amount of time that the execution of an interrupt handler is deferred is greater than the timeout, the atomic transaction can be aborted and rolled back. Then, any deferred interrupt handlers can be executed and the atomic transaction can be retried.

In some embodiments, a signal interrupt can be handled upon receipt (and not deferred) during an atomic transaction until an instruction in the interrupt handler would perform (if executed) an operation that is not allowed in an atomic transaction. For example, if execution of an instruction to be executed in the interrupt handler would enable detection of any operations external to the atomic transaction (e.g., accesses to atomic objects, memory lock acquisitions and releases, etc.), the processor 102 will not execute the instruction. Rather, the processor 102 will defer execution of the remainder of the interrupt handler until the atomic transaction 110 has committed or aborted. In some embodiments, prior to initiating the interrupt handler, the processor 102 can execute an instruction to cause that the stack to be maintained at an alternative location during execution of the interrupt handler. For example, for a POSIX-based system, the function signalstack( ) can be used to move the stack to an alternative location. Accordingly, the state of the stack during execution of the interrupt handler can be maintained even if completion of the interrupt handler is deferred until the atomic transaction is completed. After the atomic transaction is completed and the interrupt handler continues, the processor 102 can resume use of the stack at the alternative location. Therefore, the state of the stack for the interrupt handler is maintained even if execution of the interrupt handler ceases to allow the atomic transaction to commit or abort prior to its completion.

In some embodiments, a signal interrupt can be handled upon receipt (and not deferred) during an atomic transaction if the interrupt handler for the signal interrupt satisfies one or more conditions. In some embodiments, one such condition that the interrupt handler is to satisfy is that the interrupt handler cannot include any operations that are not permitted within atomic transactions. For example, the interrupt handler cannot contain any operations detectable external to an atomic transaction (e.g., accesses to atomic objects, memory lock acquisitions and releases, etc.). In some embodiments, another such condition that the interrupt handler is to satisfy is that the interrupt handler cannot contain references to objects of a defined type that would violate the atomicity of an atomic transaction. For example, the atomic transaction cannot contain references to objects that can be loaded from or stored into storage or memory across more than one instruction cycle. In other words, objects cannot allow for load tearing or store tearing. Therefore, these objects cannot be separated into multiple parts (e.g., bytes) such that only one part is loaded from or stored into storage or memory for a given instruction cycle.

In some embodiments, a signal interrupt can be handled upon receipt (and not deferred) during an atomic transaction if both the interrupt handler for the signal interrupt and the atomic transactions satisfy one or more conditions. In some embodiments, one such condition that the interrupt handler is to satisfy is that the interrupt handler cannot include any operations that are not permitted within atomic transactions. In some embodiments, another such condition that the atomic transaction is to satisfy is that the atomic transaction cannot contain references to objects of a defined type that would violate the atomicity of an atomic transaction. For example, the atomic transaction cannot contain references to objects that can be loaded from or stored into storage or memory across more than one instruction cycle.

Figure 2:
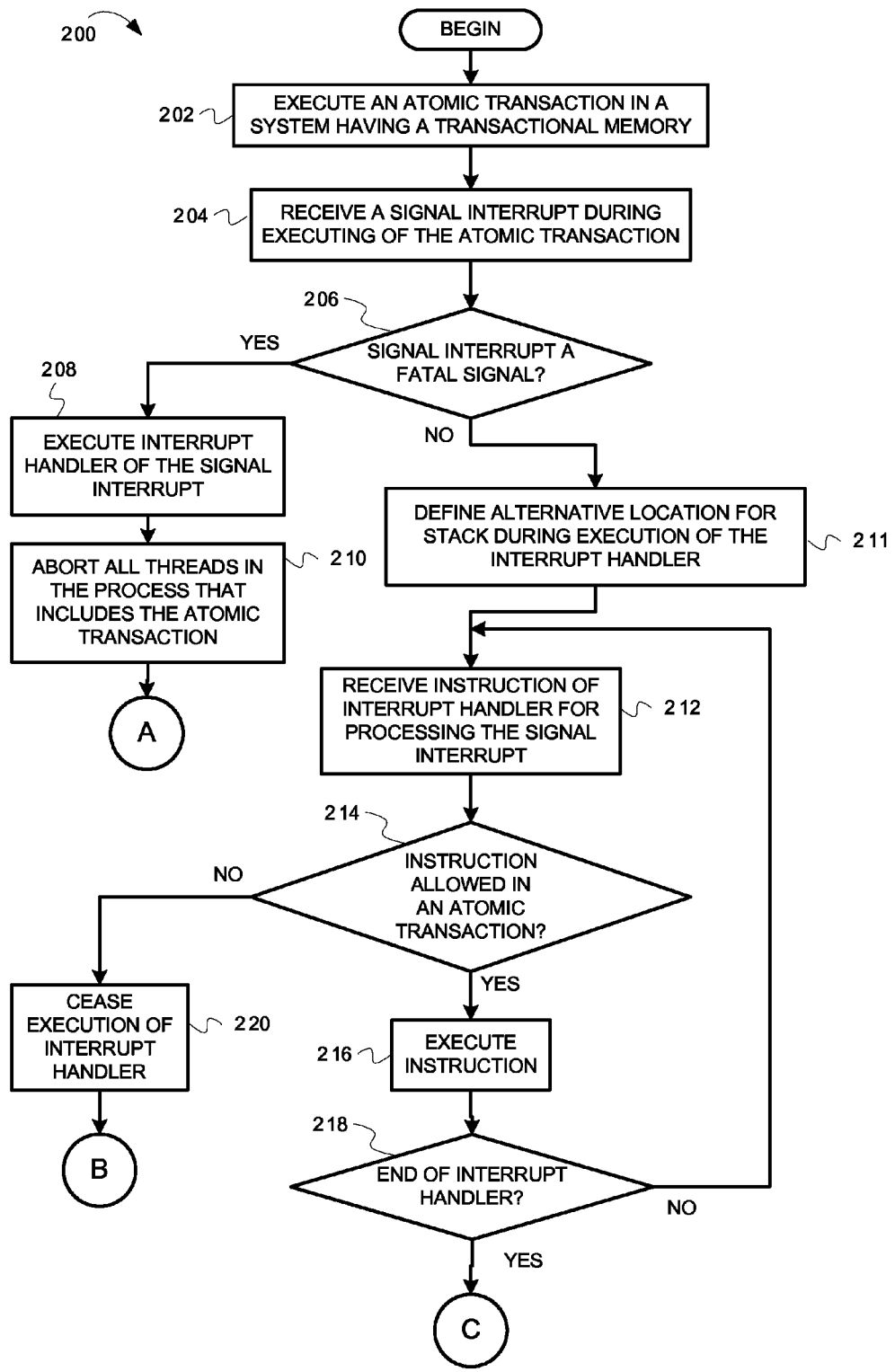
FIGS. 2-4 depict flowcharts for handling signal interrupts while an atomic operation is being executed in a transaction memory system, according to some embodiments.
Figure 3:
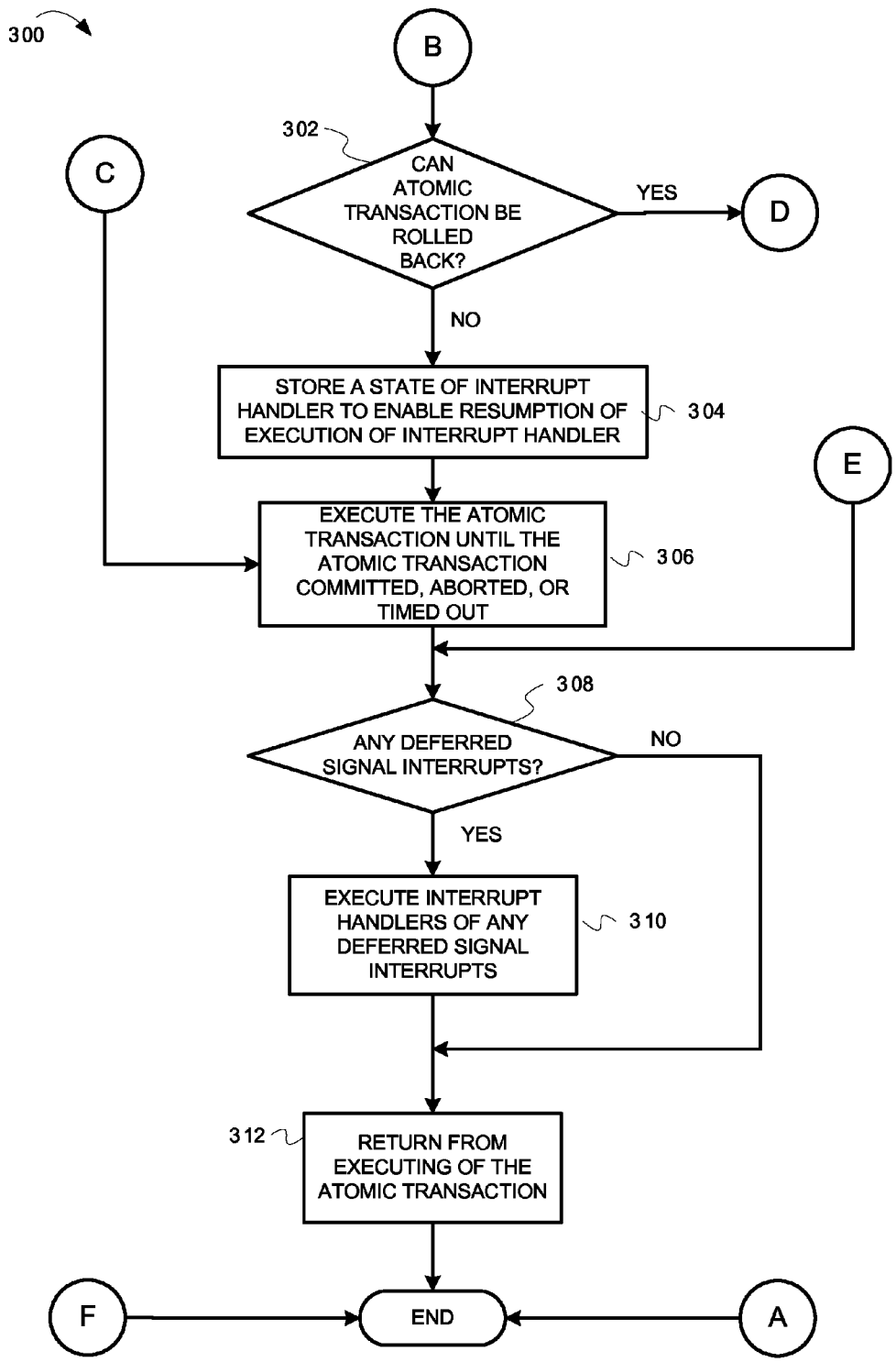
Figure 4:
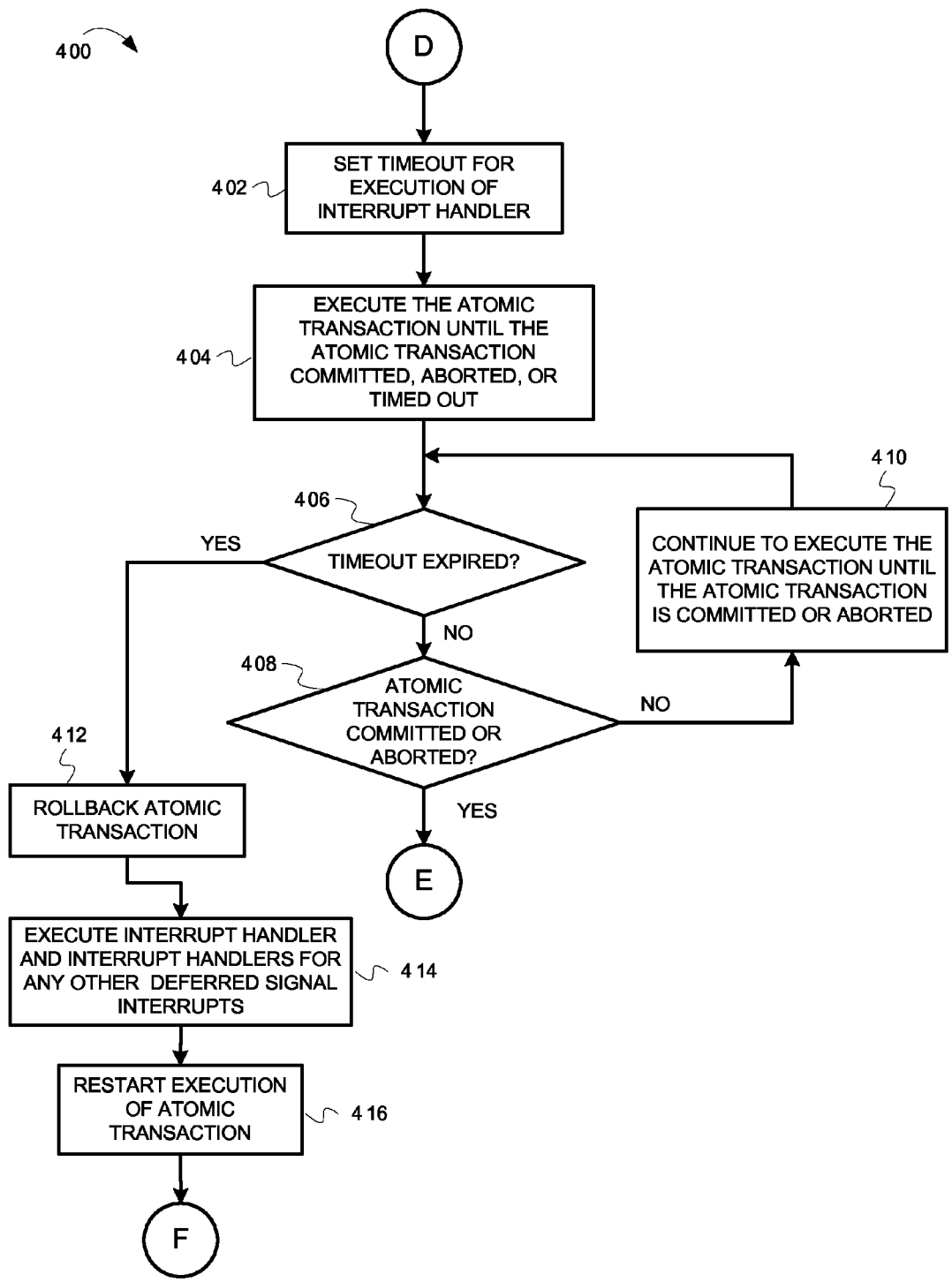
Figure 5:
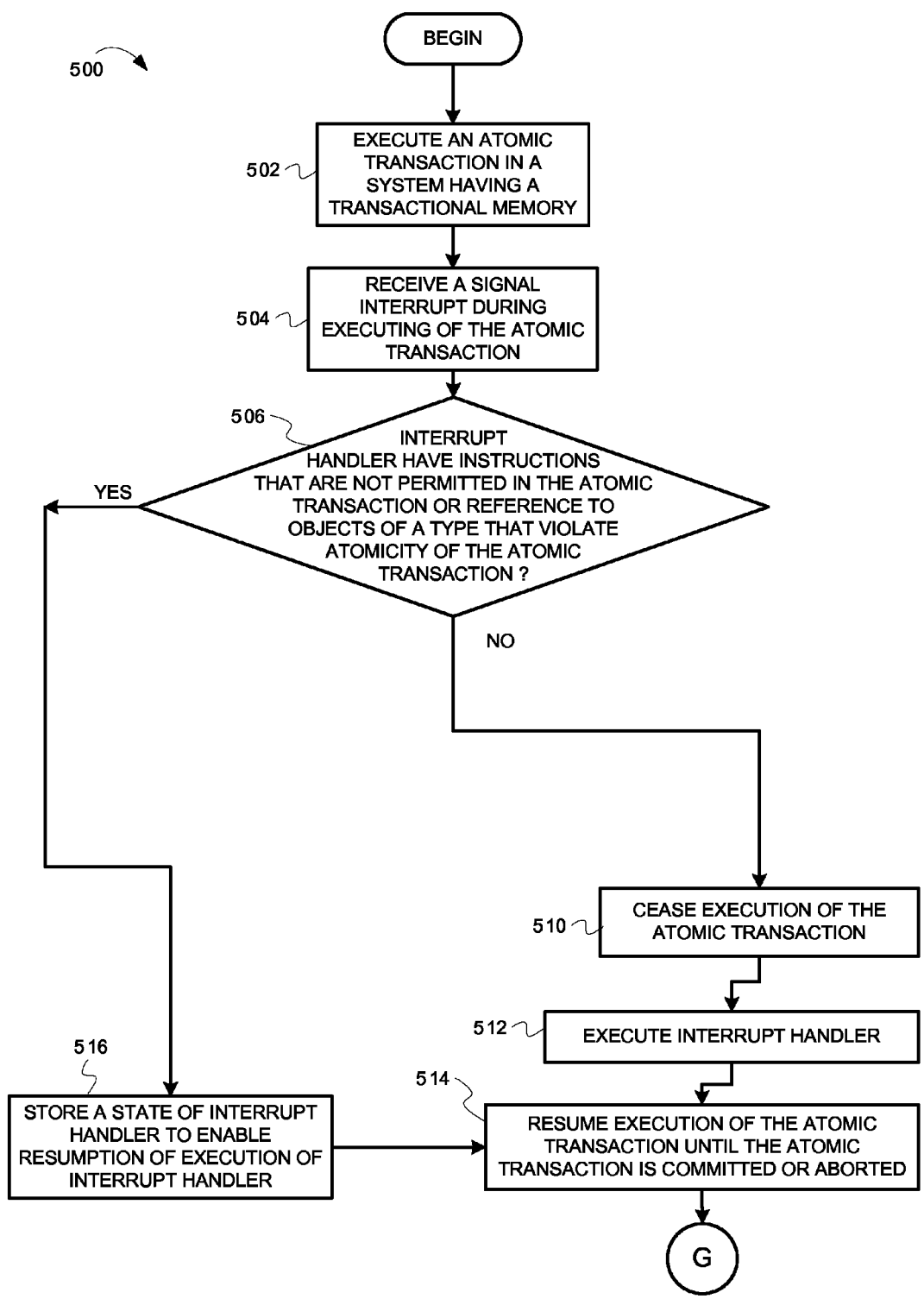
FIGS. 5-6 depict flowcharts for handling signal interrupts while an atomic operation is being executed in a transaction memory system, according to some other embodiments.
Figure 6:
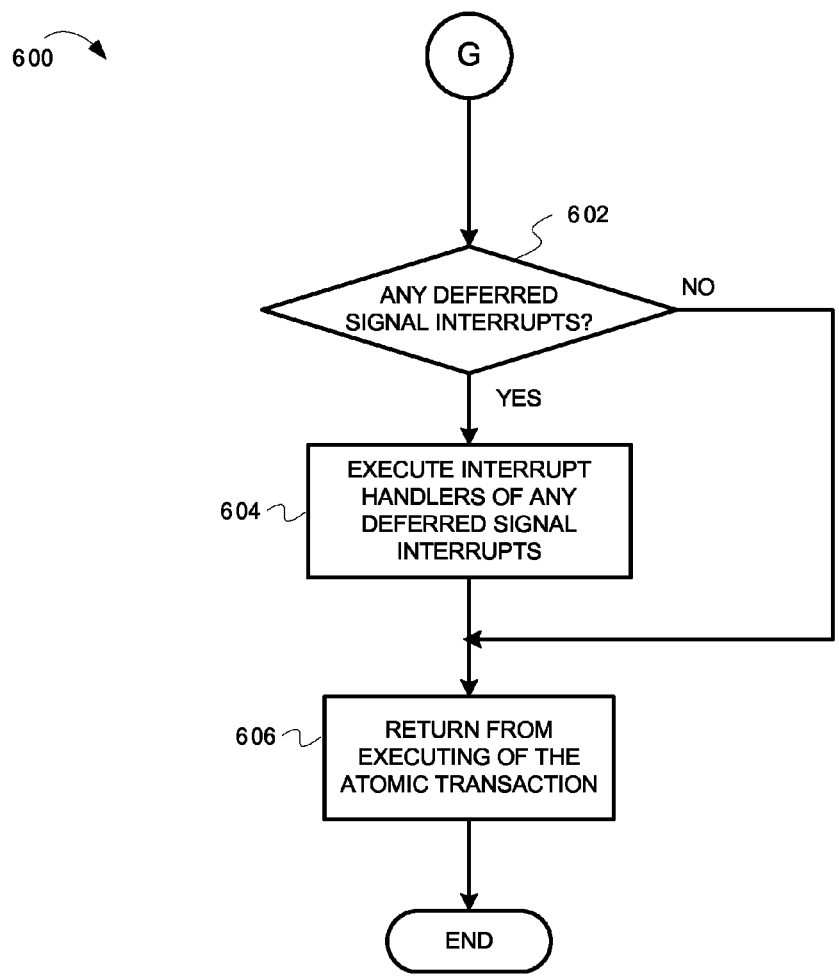

Example operations for handling signal interrupts while an atomic operation is being executed in a transaction memory system are now described. Various embodiments for processing signal interrupts while an atomic transaction is being executed in a transactional memory system can be practiced together or separately. For example, one, some, or all of the various embodiments described herein can be used for processing signal interrupts while an atomic transaction is being executed in a transactional memory system. FIGS. 2-4 depict flowcharts that include a first grouping of some of the various embodiments for handling signal interrupts. FIGS. 5-6 depict flowcharts that include a second grouping of some of the various embodiments for handling signal interrupts.

FIGS. 2-4 depict flowcharts for handling signal interrupts while an atomic operation is being executed in a transaction memory system, according to some embodiments. The operations depicted in flowcharts 200-400 in FIGS. 2-4 describe that some of these various embodiments are practiced together. However, these various embodiments for processing signal interrupts can be practiced separately. The operations of the flowchart 200, the flowchart 300, and the flowchart 400 are performed together and continue among each other as defined by transition points A-F. FIGS. 2-4 are described in reference to the system 100 of FIG. 1. Operations of the flowchart 200 begin at block 202.

At block 202, the processor 102 executes an atomic transaction in a system having a transactional memory. For example, with reference to FIG. 1, the processor 102 can execute the atomic transaction 110 as part of executing the thread 108 of the process 106. Operations of the flowchart 200 continue at block 204.

At block 204, the processor 102 receives a signal interrupt during executing of the atomic transaction. For example, with reference to FIG. 1, the processor 102 can receive the signal interrupt 114 (through the kernel 105) during executing of the atomic transaction 110. Operations of the flowchart 200 continue at block 206.

At block 206, the processor 102 determines whether the signal interrupt is a fatal signal. For example, with reference to FIG. 1, the processor 102 can determine whether the signal interrupt 114 is a fatal signal. If the signal interrupt 114 is a fatal signal which would result in the aborting of the process 106 that includes the atomic transaction 110, the interrupt handler for the signal interrupt 114 is not deferred.

Rather, this fatal signal is processed prior to completion of the atomic transaction 110. If the signal interrupt is a fatal signal, operations of the flowchart 200 continue at block 208. Otherwise, operations of the flowchart 200 continue at block 212 (which is further described below).

At block 208, the processor 102 executes the interrupt handler of the signal interrupt. For example, with reference to FIG. 1, the processor 102 can execute the interrupt handler of the signal interrupt 114. Operations of the flowchart 200 continue at block 210.

At block 210, the processor 102 aborts all threads in the process that includes the atomic transaction that was interrupted. For example, with reference to FIG. 1, the processor 102 aborts the threads 108 and 109 in the process 106. In some embodiments, if the signal interrupt 114 is a fatal signal, a flag can be set that precludes return to the atomic transaction 110 after the interrupt handler for the signal interrupt 114 is complete. Therefore, the processor 102 can be configured to check this flag after execution of an interrupt handler. If this flag is set, the processor 102 can abort the processor 106 (including all threads) after the interrupt handler is executed. Operations of the flowchart 200 continue at transition point A in the flowchart 300 of FIG. 3, which completes the operations.

Returning to block 206, if the signal interrupt is not a fatal signal, operations of the flowchart 200 continue at block 211.

At block 211, the processor 102 defines an alternative location for the stack during execution of the interrupt handler. In some embodiments, prior to initiating the interrupt handler, the processor 102 can execute an instruction to cause that the stack to be maintained at an alternative location during execution of the interrupt handler. For example, for a POSIX-based system, the function signalstack( ) can be used to move the stack to an alternative location. Accordingly, the state of the stack during execution of the interrupt handler can be maintained (at this alternative location) even if completion of the interrupt handler is deferred until the atomic transaction is completed. In particular, if the interrupt handler is deferred to allow the atomic transaction to complete, the processor 102 will not use this alternative location for the stack to complete the atomic transaction. Therefore the state of the stack for the interrupt handler is maintained and can be returned to subsequently to complete execution of the interrupt handler. After the atomic transaction is completed and the interrupt handler continues, the processor 102 can resume use of the stack at the alternative location. Therefore, the state of the stack for the interrupt handler is maintained even if execution of the interrupt handler ceases to allow the atomic transaction to commit or abort prior to its completion. Operations of the flowchart 200 continue at block 212.

At block 212, the processor 102 receives an instruction of the interrupt handler for execution as part of processing the signal interrupt. Accordingly, in this example, the processor 102 can attempt to initiate execution of the interrupt handler in response to the signal interrupt (not waiting until the atomic transaction is committed or aborted). Operations of the flowchart 200 continue at block 214.

At block 214, the processor 102 determines whether the instruction of the interrupt handler is allowed to be executed in an atomic transaction. For example, if execution of this instruction in the interrupt handler would enable detection of any operations external to the atomic transaction (e.g., accesses to atomic objects, memory lock acquisitions and releases, etc.), the processor 102 will not execute the instruction. If the instruction is allowed in an atomic transaction, operations of the flowchart 200 continue at block 216. Otherwise, operations of the flowchart 200 continue at block 220 (which is further described below).

At block 216, the processor 102 executes the instruction of the interrupt handler. Operations of the flowchart 200 continue at block 218.

At block 218, the processor 102 determines whether this is the last instruction in the interrupt handler. If not, operations of the flowchart 200 return to block 212 to receive the next instruction. If this is the last instruction, operations of the flowchart 200 continue at transition point C, which continues at transition point C in the flowchart 300 of FIG. 3.

Returning to block 214, if the received instruction for the interrupt handler is not allowed in an atomic transaction, operations of the flowchart 200 continue at block 220.

At block 220, the processor 102 ceases execution of the interrupt handler. In particular, the processor 102 ceases execution of the interrupt handler because the instruction to be executed in the interrupt handler was not allowed in an atomic transaction. Operations of the flowchart 200 continue at transition point B, which continues at transaction point B in the flowchart 300 of FIG. 3.

FIG. 3, which includes the flowchart 300 that continues the operations from the flowchart 200, is now described. Operations of the flowchart 300 begin at block 302 from the transition point B.

At block 302, the processor 102 determines whether the atomic transaction can be rolled back. In some embodiments, an atomic transaction can be rolled backed and subsequently be re-executed. Specifically, systems having an atomic transaction that can be rolled backed are configured such that during execution of the atomic transaction the state of the system can be returned what it was prior to beginning its execution. For example, any changes to data can be backed out such that the value of the data is reset to its original value prior to the beginning of execution of the atomic transaction. If the atomic transaction can be rolled back, operations of the flowchart 300 continue at transition point D, which continues at transition point D in the flowchart 400 of FIG. 4 (which is further described below). If the atomic transaction cannot be rolled back, operations of the flowchart 300 continue at block 304.

At block 304, the processor 102 stores a state of the interrupt handler to enable resumption of execution of interrupt handler after the atomic transaction has committed or aborted. For example, the state can include an identification of the signal interrupt 114, an identification of the interrupt handler to invoke, any parameters provided as part of execution of the interrupt handler, the next instruction to execute, etc. With reference to FIG. 1, the processor 102 can store the state of the interrupt handler as an element in the deferred state 116. Operations of the flowchart 300 continue at block 306.

At block 306, the processor 102 executes the atomic transaction until the atomic transaction is committed, aborted, or timed out. With reference to FIG. 1, the processor 102 can execute the atomic transaction 110 as part of executing the thread 108 of the process 106. For example, if execution of the atomic transaction 110 was interrupted by execution (at least partially) of an interrupt handler, the processor 102 can resume execution of the atomic transaction 110 where operations ceased to execute the interrupt handler. Operations of the flowchart 300 continue at block 308.

At block 308, the processor 102 determines whether there are any signal interrupts that have been deferred until after the atomic transaction has committed or aborted. With reference to FIG. 1, the processor 102 can access the deferred state 116 to determine if there are any states of signal interrupts deferred therein. There can be none, one or multiple deferred signal interrupts. If there are no deferred signal interrupts, operations of the flowchart 300 continue at block 312 (which is further described below). If there are deferred signal interrupts, operations of the flowchart 300 continue at block 310.

At block 310, the processor 102 executes interrupt handlers of any deferred signal interrupts. With reference to FIG. 1, the processor 102 can retrieve the state of the interrupt handlers from the deferred state 160 for each of the deferred signal interrupts. The processor 102 can then resume execution of the interrupt handlers at the point where execution ceased. In some embodiments, the order of execution of the interrupt handlers can be based on the order the signal interrupts were received. Operations of the flowchart 300 continue at block 310.

At block 312, the processor 102 returns from executing the atomic transaction. After interrupt handlers for any deferred signal interrupts are executed, the processor 102 can then consider the atomic transaction 110 committed or aborted and can return from executing of the atomic transaction 110. Operations of the flowchart 300 are then complete along this path.

As described above, if the last instruction of the interrupt handler has been executed, operations of the flowchart 200 continue at transition point C, which continues at transition point C in the flowchart 300 of FIG. 3. From the transition point C in the flowchart 300, operations of the flowchart 300 continue at block 306, where the processor 102 executes the atomic transaction until the atomic transaction is completed or aborted.

FIG. 4, which includes the flowchart 400 that continues the operations from the flowchart 300 from transition point D, is now described. In particular, these set of operations in the flowchart 400 are performed if the atomic transaction can be rolled back (as described above). Operations of the flowchart 400 begin at block 402 from the transition point D.

At block 402, the processor 102 sets a timeout for execution of the interrupt handler. The value of the timeout can be a configurable value that varies depending on a type of system, a type of atomic transaction, a type of signal interrupt that has been deferred, etc. If an amount of time that the execution of an interrupt handler is deferred is greater than the value of the timeout, the atomic transaction can be aborted and rolled back. Then, any deferred interrupt handlers can be executed and the atomic transaction can be retried. Operations of the flowchart 400 continue at block 404.

At block 404, the processor 102 executes the atomic transaction until the atomic transaction is committed, aborted, or timed out. With reference to FIG. 1, the processor 102 can execute the atomic transaction 110 as part of executing the thread 108 of the process 106. For example, if execution of the atomic transaction 110 was interrupted by execution (at least partially) of an interrupt handler, the processor 102 can resume execution of the atomic transaction 110 where operations ceased to execute the interrupt handler. Operations of the flowchart 400 continue at block 406.

At block 406, the processor 102 determines whether the timeout has expired for execution of the interrupt handler. The processor 102 determines that the timeout has expired if an amount of time that the execution of an interrupt handler is deferred is greater than the value of the timeout. If the timeout has expired, operations of the flowchart 400 continue at block 412 (which is further described below). If the timeout has not expired, operations of the flowchart 400 continue at block 408.

At block 408, the processor 102 determines whether the atomic transaction has committed or aborted. With reference to FIG. 1, the processor 102 can determine whether the atomic transaction 110 has been committed or aborted. If the atomic transaction has been committed or aborted, operations of the flowchart 400 continue at transition point E, which continues at transition point E in the flowchart 300 (checking whether there are any deferred signal interrupts at block 308, described above). If the atomic transaction has not been committed or aborted, operations of the flowchart 400 continue at block 410.

At block 410, the processor 102 continues to execute the atomic transaction until the atomic transaction is committed or aborted. Operations of the flowchart 400 return to block 406 to determine whether the timeout has expired for execution of the interrupt handler. Therefore, the processor 102 either commits or aborts the atomic transaction or performs rollback operations for the atomic transaction (see blocks 412-416 below) because the timeout has expired.

If the timeout has expired at block 406, operations of the flowchart 400 continue at block 412.

At block 412, the processor 102 rollbacks the atomic transaction. With reference to FIG. 1, the processor 102 ceases execution of the atomic transaction 110. Also, the processor 102 can rollback the atomic transaction 110 such that the state of the system 100 can be returned what it was prior to beginning its execution due to any operations performed by the atomic transaction 110. For example, any changes to data can be backed out such that the value of the data is reset to its original value prior to the beginning of execution of the atomic transaction. Operations of the flowchart 400 continue at block 414.

At block 414, the processor 102 executes the interrupt handler for the deferred signal interrupt whose timeout has expired and executes interrupt handlers for any other deferred signal interrupts. With reference to FIG. 1, the processor 102 can retrieve the state of the interrupt handlers from the deferred state 160 for each of the deferred signal interrupts. The processor 102 can then resume execution of the interrupt handlers at the point where execution ceased. For example, one or more of the interrupt handlers may have been partially executed (as described above). Operations of the flowchart 400 continue at block 416.

At block 416, the processor 102 restarts execution of the atomic transaction. With reference to FIG. 1, the processor 102 can restart the execution of the atomic transaction 110. Operations of the flowchart 400 continue at transition point F, which continues at transition point F in the flowchart 300, which completes the operations along this path.

Accordingly as described, FIGS. 2-4 includes a first grouping of some of the various embodiments for handling signal interrupts. For example, FIGS. 2-4 includes an embodiment to account for fatal signal interrupts, an embodiment for immediate execution of interrupt handlers up to the point where an instruction would not be allowed in an atomic transaction, an embodiment to rollback atomic transactions based on a timeout, etc. As described above, these different embodiments for handling signal interrupts can be practiced individually or together in different combinations.

FIGS. 5-6 depict flowcharts for handling signal interrupts while an atomic operation is being executed in a transaction memory system, according to some other embodiments. The operations depicted in flowcharts 500-600 in FIGS. 5-6 describe that some of these various embodiments are practiced together. However, these various embodiments for processing signal interrupts can be practiced separately. The operations of the flowchart 500 and the flowchart 600 are performed together and continue between each other as defined by transition point G. FIGS. 5-6 are described in reference to the system 100 of FIG. 1. Operations of the flowchart 500 begin at block 502.

At block 502, the processor 102 executes an atomic transaction in a system having a transactional memory. For example, with reference to FIG. 1, the processor 102 can execute the atomic transaction 110 as part of executing the thread 108 of the process 106. Operations of the flowchart 500 continue at block 504.

At block 504, the processor 102 receives a signal interrupt during executing of the atomic transaction. For example, with reference to FIG. 1, the processor 102 can receive the signal interrupt 114 (through the kernel 105) during executing of the atomic transaction 110. Operations of the flowchart 500 continue at block 506.

At block 506, the processor 102 determines whether the interrupt handler for the signal interrupt has instructions that are not permitted in an atomic transaction or reference to objects of a defined type that would violate the atomicity of an atomic transaction. For example, the processor 102 determines whether the interrupt handler for the signal interrupt 114 has instructions that are not permitted in an atomic transaction or reference to objects of a defined type that would violate the atomicity of an atomic transaction. Examples of operations that are not permitted in an atomic transaction can include operations detectable external to an atomic transaction (e.g., accesses to atomic objects, memory lock acquisitions and releases, etc.). Examples of objects of a defined type that would violate the atomicity of an atomic transaction include objects that can be loaded from or stored into storage or memory across more than one instruction cycle. In other words, the objects cannot allow for load tearing or store tearing. Therefore, these objects cannot be separated into multiple parts (e.g., bytes) such that only one part is loaded from or stored into storage or memory for a given instruction cycle. If the interrupt handler for the signal interrupt has instructions that are not permitted in an atomic transaction or reference to objects of a defined type that would violate the atomicity of an atomic transaction, operations of the flowchart 500 continue at block 516 (which is further described below). Otherwise, operations of the flowchart 500 continue at block 510.

At block 510, the processor 102 ceases execution of the atomic transaction. With reference to FIG. 1, the processor 102 ceases execution of the atomic transaction 110 to execute the interrupt handler for the signal interrupt 114. Operations of the flowchart 500 continue at block 512.

At block 512, the processor 102 executes the interrupt handler. With reference to FIG. 1, the processor 102 executes the interrupt handler for the signal interrupt 114. Operations of the flowchart 500 continue at block 514.

At block 514, the processor 102 resumes execution the atomic transaction until the atomic transaction is committed or aborted. Operations of the flowchart 500 continue at transition point G, which continues at transition point G in the flowchart 600 of FIG. 6.

At block 516, the processor 102 stores a state of the interrupt handler to enable resumption of execution of interrupt handler after the atomic transaction has committed or aborted. For example, the state can include an identification of the signal interrupt 114, an identification of the interrupt handler to invoke, any parameters provided as part of execution of the interrupt handler, the next instruction to execute, etc. With reference to FIG. 1, the processor 102 can store the state of the interrupt handler as an element in the deferred state 116. Operations of the flowchart 500 continue at block 514.

FIG. 6, which includes the flowchart 600 that continues the operations from the flowchart 500, is now described. Operations of the flowchart 600 begin at block 602 from the transition point G.

At block 602, the processor 102 determines whether there are any signal interrupts that have been deferred until after the atomic transaction has committed or aborted. With reference to FIG. 1, the processor 102 can access the deferred state 116 to determine if there are any states of signal interrupts deferred therein. There can be none, one or multiple deferred signal interrupts. If there are no deferred signal interrupts, operations of the flowchart 600 continue at block 606 (which is further described below). If there are deferred signal interrupts, operations of the flowchart 600 continue at block 604.

At block 604, the processor 102 executes interrupt handlers of any deferred signal interrupts. With reference to FIG. 1, the processor 102 can retrieve the state of the interrupt handlers from the deferred state 160 for each of the deferred signal interrupts. The processor 102 can then resume execution of the interrupt handlers at the point where execution ceased. In some embodiments, the order of execution of the interrupt handlers can be based on the order the signal interrupts were received. Operations of the flowchart 600 continue at block 606.

At block 606, the processor 102 returns from executing the atomic transaction. After interrupt handlers for any deferred signal interrupts are executed, the processor 102 can then consider the atomic transaction 110 committed or aborted and can return from executing of the atomic transaction 110. Operations of the flowchart 600 are then complete.

Accordingly as described, FIGS. 5-6 includes a second grouping of some of the various embodiments for handling signal interrupts. For example, FIGS. 5-6 includes embodiments for immediate executing of an interrupt handler if certain conditions are satisfied by the operations of the interrupt handler and/or the atomic transaction. As described above, these different embodiments for handling signal interrupts can be practiced individually or together. Also, the embodiments described in FIGS. 2-4 can be practiced in different combinations with the embodiments described in FIGS. 5-6.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 7:
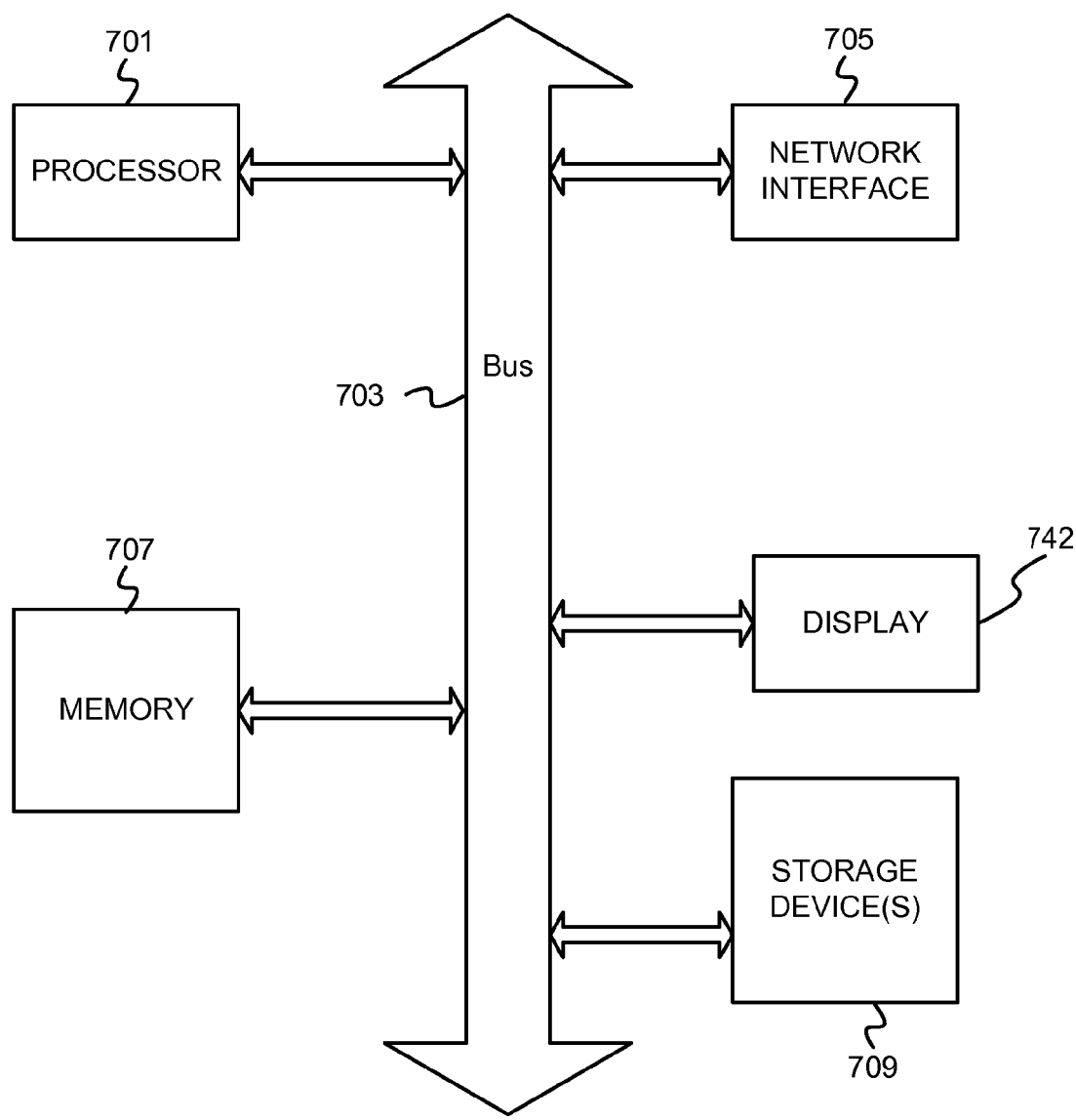
FIG. 7 depicts a computer, according to some embodiments.

FIG. 7 depicts a computer, according to some embodiments. A computer system includes a processor 701 (possibly including multiple processors, multiple cores, multiple nodes, and/or implementing multi-threading, etc.). The computer system includes a memory 707. The memory 707 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 703 (e.g., PCI, ISA, PCI-Express, HyperTransport®, InfiniBand®, NuBus, etc.), a network interface 705 (e.g., an ATM interface, an Ethernet interface, a Frame Relay interface, SONET interface, wireless interface, etc.), and a storage device(s) 709 (e.g., optical storage, magnetic storage, etc.). The computer system includes a display 742. Any one of these operations described herein may be partially (or entirely) implemented in hardware and/or on the processor 701. For example, the operations may be implemented with an application specific integrated circuit, in logic implemented in the processor 701, in a co-processor on a peripheral device or card, etc.

Further, realizations may include fewer or additional components not illustrated in FIG. 7 (e.g., video cards, audio cards, additional network interfaces, peripheral devices, etc.). The processor 701, the storage device(s) 709, the network interface 705, the memory 707, and the display 742 are coupled to the bus 703. Although illustrated as being coupled to the bus 703, the memory 707 may be coupled to the processor 701.

While the embodiments are described with reference to various implementations and exploitations, it will be understood that these embodiments are illustrative and that the scope of the inventive subject matter is not limited to them. In general, techniques for handling signal interrupts as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components.

These and other variations, modifications, additions, and improvements may fall within the scope of the inventive subject matter.

What is claimed is:

1. A computer program product for processing a signal interrupt, the computer program product comprising:
 a non-transitory computer readable storage medium having computer usable program code embodied therewith, the computer usable program code executable by a processor to cause the processor to:
  begin execution of an atomic transaction in a system having a transactional memory;
  during execution of the atomic transaction:
   receive the signal interrupt;
   determine whether an interrupt handler for processing the signal interrupt includes an instruction that would be detectable external to the atomic transaction;
   in response to determining the interrupt handler does include the instruction that would be detectable external to the atomic transaction:
    cease execution of the interrupt handler and continue execution of the atomic transaction; and
   in response to determining the interrupt handler does not include the instruction that would be detectable external to the atomic transaction:
    execute the instruction.

2. The computer program product of claim 1, wherein the computer usable program code is configured to:
 determine whether the atomic transaction can be rolled back;
 in response to determining the atomic transaction cannot be rolled back:
  store a state of the interrupt handler;
  subsequent to completion of the atomic transaction, execute the interrupt handler based upon the state.

3. The computer program product of claim 2, wherein the computer usable program code is configured to:
 in response to determining the atomic transaction can be rolled back:
  determine whether a timeout threshold has been exceeded; and
  in response to determination that the timeout threshold has been exceeded, rollback the atomic transaction; execute the interrupt handler for processing the signal interrupt; and
  re-execute the atomic transaction.

4. The computer program product of claim 1, wherein the computer usable program code is configured to:
 define an alternative location for stack execution.

5. The computer program product of claim 1, the computer usable program code is configured to:
 determine whether the signal interrupt comprises a signal to abort a process comprising the atomic transaction; and
 in response to determining that the signal interrupt comprises the signal to abort the process,
  cease execution of the atomic transaction;
  execute the interrupt handler for processing the signal interrupt; and
  abort the atomic transaction and threads that are part of the process.

6. The computer program product of claim 1, wherein the atomic transaction comprises a transaction having operations that are non-detectable external to the atomic transaction.

7. An apparatus comprising:
 a processor; and
 a computer readable storage medium configured to store computer usable program code, wherein the computer usable program code is executable on the processor in a transaction memory configuration, wherein the computer usable program code is configured to:
  begin execution of an atomic transaction;
  during executing of the atomic transaction:
   receive a signal interrupt;
   determine whether an interrupt handler for processing the signal interrupt includes an instruction that would be detectable external to the atomic transaction;
   in response to determining the interrupt handler does include the instruction that would be detectable external to the atomic transaction:
    cease execution of the interrupt handler and continue execution of the atomic transaction; and
   in response to determining the interrupt handler does not include the instruction that would be detectable external to the atomic transaction:
    execute the instruction.

8. The apparatus of claim 7, wherein the computer usable program code is configured to:
 determine whether the atomic transaction can be rolled back;
 in response to determining the atomic transaction cannot be rolled back:
  store a state of the interrupt handler;
  subsequent to completion of the atomic transaction, execute the interrupt handler based upon the state.

9. The apparatus of claim 8, wherein the computer usable program code is configured to:
 in response to determining the atomic transaction can be rolled back:
  determine whether a timeout threshold has been exceeded; and
  in response to a determination that the timeout threshold has been exceeded:
   rollback the atomic transaction;
   execute the interrupt handler for processing the signal interrupt; and
   re-execute the atomic transaction.

10. The apparatus of claim 7, wherein the computer usable program code is configured to:
 define an alternative location for stack execution.

11. The apparatus of claim 7, wherein the computer usable program code is configured to:
 determine whether the signal interrupt comprises a signal to abort a process comprising the atomic transaction; and
 in response to determining that the signal interrupt comprises the signal to abort the process, cease execution of the atomic transaction and execute the interrupt handler for processing the signal interrupt.

12. The apparatus of claim 11, wherein the computer usable program code is configured to:
 in response to determining that the signal interrupt comprises the signal to abort the process: abort the atomic transaction and threads that are part of the process.

13. The apparatus of claim 7, wherein the atomic transaction comprises a transaction having operations that are non-detectable external to the atomic transaction.

* * * * *